Patented May 7, 1935

2,000,031

UNITED STATES PATENT OFFICE 2,000,031

COMPOSITION OF MATTER, ETC.

Leon H. Larson, Norwalk, Conn., assignor to R. T. Vanderbilt Co. Inc., New York, N. Y., a corporation of New York No Drawing. Application April 11, 1932,
Serial No. 604,651

9 Claims. (Cl. 134—18)

This invention relates to a new composition of matter and to improved methods of using the same for coating, filling and other purposes.

The new composition is a dry mixture in which lime and alum are intimately admixed with titanium dioxide either without or with the addition of a mineral inert material such as clay, etc. The dry composition is prepared by mixing the materials dry to obtain an intimate and uniform admixture.

When the dry composition is added to water in suitable amount, and in regulated proportion, the lime and alum will react in the presence of the titanium oxide, or of the titanium oxide and clay, etc., to form a reaction mixture or composition which in itself is a new and valuable composition, adapted for various purposes, and which can be used advantageously for the coating of paper or textiles, etc., or as a filling material, or for various other purposes.

The invention is of particular value for the coating of papers of various kinds where it is important to impart opacity to the paper, and it enables opacity, as well as a white color, or improved color, to be imparted to paper. An important application of the invention is in the treating of tissue paper where it is important to have opacity, particularly where the tissue paper is to be waxed, or is to be printed, since ordinary waxed tissue paper is lacking in opacity. The composition can also be advantageously used for the coating of boards to give a paper board of white color or of improved color, as well as for the treatment of book paper and other papers where both whiteness and opacity are desired.

The reaction product of lime and alum is a white product which, when applied to paper, gives a white colored paper when the paper is dry, but when the paper is waxed, the oil or wax penetrates through the reaction product and reduces the opacity or whiteness of the paper. The admixture of clay with the lime and alum before reaction gives an improved composition for coating and filling paper, but the composition is also lacking in its property of imparting opacity to paper which is to be waxed or printed.

I have found, however, that when titanium dioxide is intimately admixed with lime and alum, or with lime, alum and clay, etc., and the resulting mixture is brought into contact with a regulated amount of water and caused to react, the reaction product has valuable properties for coating and filling paper, etc., and particularly for imparting opacity, as well as whiteness, to paper, particularly paper which is to be waxed or printed.

In using the dry mixture, and in causing the reaction between the lime and alum to take place in the presence of titanium oxide, or of the titanium oxide and clay, etc., it is important to use a limited and regulated amount of water so that a relatively stiff or thick reaction product is produced in which the titanium oxide, or the titanium oxide and clay, etc., is suspended in the colloidal or gelatinous reaction product of the lime and alum. In general, from 60 to 150 parts of water can be used for 100 parts of the dry mixture of lime, alum, clay and titanium oxide.

The proportions of the ingredients used in the new dry composition can be varied. When clay is used, it will in general be the preponderating ingredient, amounting to 50% or more of the dry mixture, while the lime, alum and titanium oxide together amount to from 10 to 50% of the weight of the clay or of the total dry mixture. The titanium oxide can be used in varying amounts, for example, in amounts equal to or somewhat greater than the amount of lime and alum together, or even in increased amounts. The proportions of alum and lime to each other can also be varied, for example, from about equal proportions of lime and alum to an amount of alum which is about three times the weight of the lime or somewhat more.

The following examples illustrate different proportions of the ingredients in the dry mixture:

| Clay | 720 | 900 | 900 | 500 | 500 |
|---|---|---|---|---|---|
| Titanium oxide | 160 | 60 | 60 | 300 | 300 |
| Alum | 80 | 30 | 20 | 100 | 150 |
| Lime | 40 | 10 | 20 | 100 | 50 |

The amount of water used with the dry mixture can be varied, but in general a limited amount of water should be used, for example, 40 to 60 parts of water to 60 to 40 parts of the dry mixture, or from 60 to 150 parts of water for 100 parts of the dry mixture. The water can be added to the dry mixture, or the dry mixture can be added to water, and the resulting admixture should be stirred or agitated in a suitable tank or mixing apparatus to promote the reaction between the lime and alum and the obtaining the a uniform product. The reaction takes some time, but is usually completed in an hour or less. The reaction mixture is of plastic or pasty consistency.

The composition can be somewhat improved by incorporating therein a small amount of trisodium phosphate, or equivalent substance, which will serve to thin out the mixture and make it free flowing. The amount of trisodium phosphate used can be varied, for example, from around 1/10 of 1% or less up to around 2% of the other ingredients of the dry mixture.

The lime employed in the new composition is hydrated lime freed from objectionable admixture of gritty or foreign materials and in a suitably dried and finely divided state so that it can be admixed with the clay and alum and titanium oxide to form a uniform product. The alum used is the ordinary alum of commerce in a finely divided state. The clay is also used in a finely divided colloidal state for example, around 99% or more passing through 200 mesh screen, and the titanium oxide is in general finer than the clay.

Instead of using clay as the inert mineral material, other mineral materials can be employed, for example, whiting, gypsum, talc, agalite, chalk, etc.; but I consider clay particularly advantageous because of its colloidal character, and it seems to promote the maintenance of the titanium oxide in a suspended state and its uniform distribution when the composition is applied for coating purposes.

In using the new dry composition for filling paper, it is first added to water, or water is added to it, for example, in the proportions of about 40 parts of dry mixture to about 60 parts of water by weight, or in the proportions of about 1350 pounds of water to about 1500 pounds of the dry mixture, and the resulting admixture is stirred or agitated for a period of time, for example, about one hour, or until the reaction has been practically completed and a smooth uniform plastic or pasty mass obtained. The resulting reaction mixture, which may be further diluted, or which may be added without dilution, is added to the beater and forms a valuable filling composition. It appears to have a coagulating effect on the water in which the pulp is suspended so that losses in the white water or waste water are minimized. In particular, the use of titanium oxide in such a composition minimizes the losses of titanium oxide. When titanium oxide alone is put in the beater and used as a filler or to give opaqueness to the paper, a considerable amount of the titanium oxide is lost, but when used in the composition of the present invention its losses are minimized, and it is used in a particularly effective manner.

In using the new composition for coating paper, the reaction mixture, resulting from the reaction of the dry mix in water, is added to a solution or suspension of other ingredients, such as a solution of starch, casein or glue in alkali, and the resulting mixture is used for coating purposes. In general, the reaction product produced from the dry mixture, on reaction with water, can be used with starch, casein, etc., much as clay is used in coating paper, but with important advantages in giving to the paper improved whiteness and opacity.

The reaction product resulting from the reaction of lime and alum in the presence of titanium oxide, and in the absence of clay or other mineral material, can be employed for coating purposes, e. g., can be used for the coating of paper, particularly where only a small amount of the coating material is to be used, but such composition is expensive because of its relatively high proportion of titanium oxide. The addition of clay to the dry mixture, and the production of the reaction product in the presence of clay, gives an improved composition since the clay appears to help keep the titanium oxide dispersed in the composition and, even though the clay is present in preponderating amount, or in amount several times that of the other ingredients, an improvement in whiteness and opacity is nevertheless readily obtained.

In using the dry mixture for coating purposes, the reaction product will ordinarily be mixed with a solution of starch or glue or similar material using, for example, about 12% of glue on the weight of the dry mixture, or about 25% of starch on the weight of the dry mixture, although these proportions can be varied. The starch or glue, etc. will be dissolved in water, or in alkaline water, in the usual way, using, for example, 8 parts of water to 1 part of glue, or using 5 to 20 parts of water to 1 part of starch.

The following example illustrates the application of the new composition for coating:

220 pounds of the dry mixture of lime, alum, clay and titanium oxide are admixed with 330 pounds of water, and the reaction is permitted to take place with stirring or agitation. 19 pounds of starch are separately cooked with water in the proportion of about 1 pound of starch per gallon of water, and the resulting starch solution is mixed in a mixer with the reaction product of the dry mixture and the resulting intimate intermixture is further diluted if necessary to about 85 gallons in volume. It is then ready to apply as a coating material, for example, by putting it on at the tubs in place of a starch size, or by showering it on to both sides of the paper, which then goes to the dryers, or to the dryers and calenders. The example just given is suitable for the coating of tissue paper which is to be subsequently waxed.

As another example, about 120 pounds of the dry mixture, and about 28 pounds of starch, are treated as in the preceding example to form a resulting composition of about 45 gallons, and this composition is applied to paper board to give it a lighter color and an improved finish. The composition can be applied as a relatively thick composition at the water box.

A small amount, for example, about 1 to 2% (based on the weight of the dry mixture) of silicate of soda is advantageously added in some cases to prevent or reduce the tendency of the composition to pick or wash off in the water boxes.

As another example, about 1500 pounds of the dry mixture of lime, alum, clay and titanium oxide and 1350 pounds of water are admixed intimately with agitation until reaction has taken place, and about 1500 pounds more water is then added to give a thinner mixture which is then added to a starch solution made by cooking starch in about 8 parts of water for each part of starch, and using about 25% of the weight of the dry mixture. The resulting composition is well adapted for use for giving a thin coat on paper board, such as is used for butter cartons, or other boxes or containers, display cards, calendars, etc. The method of treating the paper after coating is in general the same as with other coating processes, that is, the paper is dried, calendered, etc. In making waxed paper, such as waxed tissue paper, the paper, after coating, is run through a bath of melted wax and then over chilled rolls to set the wax.

Papers of various kinds can be coated according to the present invention, including not only tissue paper, but wrapping paper, book paper, paper board, catalog papers, magazine papers, etc.

The coating may be a thin coating, or a heavier coating, varying for example, from ½ pound or 1 pound of coating material per ream up to 7 or 10 pounds or more for book paper. The coating may be a thin coating more of the nature of a tub sizing or wash, or it may be a coating for the purpose of whitening the paper or covering up its color, for example, to make a lighter colored board where the board itself before coating is not sufficiently white in color. A cheaper paper stock or board can thus be coated and whitened. The coating can be applied as a thin coating on the calender or in the tubs or by brushing or spraying the composition on to the paper or board. Yellowish paper can thus be made whiter, or white paper can be made brighter and more opaque.

The invention is of particular value for the coating or treating of paper which is to be waxed, or which is to be printed, and where it is important to have opaqueness in the waxed paper, or in the printed paper so that the printing does not show through.

I claim:

1. A new composition comprising an intimately admixed dry mixture of lime, alum and titanium oxide, the proportions of lime and alum being such that they will react to form a gelatinous precipitate when added to water which will coat and disperse the particles of titanium oxide, and the titanium oxide being in such proportions as to impart opacity to the product of such reaction, after use and drying as a coating and filling material, said composition being adapted, when added to an amount of water approximating that of the composition to form a product which, when the reaction is completed, will be of a plastic or pasty consistency, and said reaction mixture being adapted for use as a coating material and as a filling material for paper manufacture.

2. A new composition comprising an intimately admixed dry mixture of lime, alum, titanium oxide and an inert mineral material, the amount and proportions of lime and alum being such that, when the dry mixture is added to an amount of water approximating that of the dry mixture they will react to form a gelatinous precipitate which will coat and disperse the titanium oxide and inert material and will form, when the reaction is completed, a reaction mixture of a plastic or pasty consistency, which reaction mixture is adapted for use as a coating and filling material, the proportion of titanium oxide being such as to impart opacity to the composition and to the material coated or filled therewith.

3. A new composition comprising an intimately admixed dry mixture of lime, alum, titanium oxide and clay, the amount and proportions of lime and alum being such that, when the dry mixture is added to an amount of water approximating that of the dry mixture they will react to form a gelatinous precipitate which will coat and disperse the titanium oxide and clay material and will form, when the reaction is completed, a reaction mixture of a plastic or pasty consistency, which reaction mixture is adapted for use as a coating and filling material, the proportion of titanium oxide being such as to impart opacity to the composition and to the material coated or filled therewith.

4. A new composition comprising an intimately admixed dry mixture of lime, alum, titanium oxide and clay, the clay being present in preponderating amount, and the proportion of alum to lime varying from about equal proportion to around four times as much alum as lime, and the proportions of the different ingredients being such that when the dry mixture is added to an amount of water approximating that of the dry material the alum and lime will react to form a gelatinous precipitate which will surround the particles of titanium oxide and clay and coat and disperse the same, forming, when the reaction is completed, a plastic or pasty consistency, which reaction mixture is adapted for use for coating and filling purposes, and the proportion of titanium oxide in said dry mixture being such as to impart opacity to the reaction mixture and to the material coated or filled therewith.

5. The method of producing a composition suitable for use for filling or coating paper or for other purposes which comprises adding a dry mixture of lime, alum and titanium oxide to water and causing the alum and lime to react in the presence of the titanium oxide to form a reaction mixture containing the titanium oxide in suspension in the reaction products of the lime and alum, the reaction product of the lime and alum being of a gelatinous nature and coating and dispersing the particles of titanium oxide, and the proportions of titanium oxide being sufficient to give opacity to the reaction mixture and to materials filled or coated therewith.

6. The method of producing a composition suitable for use for filling or coating paper or for other purposes which comprises adding to water a dry mixture of alum, lime, titanium oxide and a mineral material and causing the alum and lime to react in the presence of the titanium oxide and the mineral material to form a reaction mixture containing the titanium oxide and mineral material in suspension in the reaction products of the lime and alum, the reaction product of the lime and alum being of a gelatinous character and coating and dispersing the particles of titanium oxide and mineral material, and the proportion of titanium oxide being such as to give opacity to the reaction mixture and to materials filled or coated therewith.

7. The method of producing a composition suitable for use for filling or coating paper or for other purposes which comprises adding to water a dry mixture of alum, lime, titanium oxide and clay and causing the alum and lime to react in the presence of the clay and titanium oxide to form a reaction mixture containing the clay and titanium oxide in suspension in the reaction products of the lime and alum, the reaction product of the lime and alum being of a gelatinous character and coating and dispersing the particles of clay and titanium oxide, and the proportions of titanium oxide being such as to give opacity to the reaction mixture and to materials filled and coated therewith.

8. Paper having a coating comprising the product which is formed when the composition set forth in claim 1 is added to water.

9. Paper having a coating comprising the product which is formed when the composition set forth in claim 3 is added to water.

LEON H. LARSON.